US010037499B2

(12) United States Patent
Hashimoto et al.

(10) Patent No.: US 10,037,499 B2
(45) Date of Patent: Jul. 31, 2018

(54) INDUSTRIAL EQUIPMENT MANAGEMENT SYSTEM, INDUSTRIAL EQUIPMENT MANAGEMENT SERVER, INDUSTRIAL EQUIPMENT MANAGEMENT METHOD, AND INFORMATION STORAGE MEDIUM

(71) Applicant: Kabushiki Kaisha Yaskawa Denki, Kitakyushu-shi, Fukuoka (JP)

(72) Inventors: Ayaka Hashimoto, Kitakyushu (JP); Tadashi Okubo, Kitakyushu (JP); Kazuhiro Imanaga, Kitakyushu (JP); Hiroshi Hashimoto, Kitakyushu (JP)

(73) Assignee: KABUSHIKI KAISHA YASKAWA DENKI, Kitakyushu-Shi, Fukuoka (JP)

( * ) Notice: Subject to any disclaimer, the term of this patent is extended or adjusted under 35 U.S.C. 154(b) by 454 days.

(21) Appl. No.: 14/526,542

(22) Filed: Oct. 29, 2014

(65) Prior Publication Data
US 2015/0120008 A1 Apr. 30, 2015

(30) Foreign Application Priority Data
Oct. 29, 2013 (JP) .................................. 2013-224711

(51) Int. Cl.
*G05B 15/02* (2006.01)
*G06Q 10/06* (2012.01)

(52) U.S. Cl.
CPC ... *G06Q 10/06* (2013.01); *G05B 2219/32036* (2013.01)

(58) Field of Classification Search
CPC ............ G05D 23/1917; G05D 23/1931; F24F 11/008; F24F 11/0012; F24F 2011/0067;
(Continued)

(56) References Cited

U.S. PATENT DOCUMENTS

| 6,514,345 | B1 | 2/2003 | Nagata et al. |
| 6,845,627 | B1 * | 1/2005 | Buck ...................... B64D 11/04 165/919 |

(Continued)

FOREIGN PATENT DOCUMENTS

| JP | 2000-010571 A | 1/2000 |
| JP | 2001-075628 A | 3/2001 |

(Continued)

OTHER PUBLICATIONS

Search Report for corresponding European Patent Application No. 14190617.2 dated Mar. 19, 2015.
(Continued)

*Primary Examiner* — Charles Kasenge
(74) *Attorney, Agent, or Firm* — HEA Law PLLC

(57) ABSTRACT

A receiver of an industrial equipment management system receives setting information to be set for an industrial equipment. A generator generates identification information in a case where the setting information is received, and associates the identification information with the setting information. An equipment manager associates, in a case where setting of the industrial equipment is performed based on the setting information associated with the generated identification information, individual identification information on the industrial equipment with the identification information.

13 Claims, 12 Drawing Sheets

(58) Field of Classification Search
CPC ............. F24F 2011/0075; G06Q 10/06; G05B 2219/32036
See application file for complete search history.

(56) References Cited

U.S. PATENT DOCUMENTS

| | | | | |
|---|---|---|---|---|
| 7,080,521 | B2* | 7/2006 | Ludwig | F25B 49/025 62/208 |
| 7,260,946 | B2* | 8/2007 | Ludwig | F25B 49/025 62/115 |
| 7,266,961 | B2* | 9/2007 | Ludwig | F25B 49/025 62/208 |
| 7,890,215 | B2* | 2/2011 | Duncan | F24F 5/0035 62/179 |
| 8,185,246 | B2* | 5/2012 | Josserand | F24F 11/0009 165/289 |
| 8,229,597 | B2* | 7/2012 | Burton | F24F 11/008 700/276 |
| 8,245,286 | B2* | 8/2012 | Nasu | H04L 63/0823 713/156 |
| 8,355,508 | B2* | 1/2013 | Nasu | H04L 63/06 380/277 |
| 8,406,929 | B2* | 3/2013 | Duncan | F24F 5/0035 165/208 |
| 8,527,098 | B2* | 9/2013 | Burton | F24F 11/008 700/276 |
| 8,997,247 | B2* | 3/2015 | Nasu | H04L 9/3263 726/27 |
| 9,519,295 | B2* | 12/2016 | Burton | G05D 23/1917 |
| 2004/0128376 | A1* | 7/2004 | Matsune | H04L 63/08 709/223 |
| 2005/0160259 | A1* | 7/2005 | Ogura | H04L 9/00 713/156 |
| 2006/0068301 | A1* | 3/2006 | Hirukawa | G03F 7/70258 430/5 |
| 2006/0270458 | A1* | 11/2006 | Watanabe | G08C 17/02 455/562.1 |
| 2009/0021391 | A1* | 1/2009 | Kamiya | B25J 9/16 340/12.15 |
| 2009/0204809 | A1* | 8/2009 | Nasu | H04L 9/3263 713/156 |
| 2009/0265546 | A1* | 10/2009 | Nasu | H04L 63/0823 713/156 |
| 2010/0268783 | A1 | 10/2010 | Mizosoe et al. | |
| 2011/0241447 | A1 | 10/2011 | Ando et al. | |
| 2013/0123944 | A1 | 5/2013 | Reichard et al. | |
| 2013/0257627 | A1 | 10/2013 | Rafael | |
| 2014/0139166 | A1* | 5/2014 | Durfee | H02P 31/00 318/494 |

FOREIGN PATENT DOCUMENTS

| | | |
|---|---|---|
| JP | 2008-077240 A | 4/2008 |
| JP | 2009-284368 A | 12/2009 |
| JP | 2011-229359 A | 11/2011 |
| JP | 2013-206473 A | 10/2013 |
| WO | 2012/144863 A2 | 10/2012 |

OTHER PUBLICATIONS

Office Action dated Sep. 20, 2016 for corresponding JP application No. 2013-224711 and Partial Translation thereof.

\* cited by examiner

FIG.4

CUSTOMIZATION ID HAS BEEN GENERATED
TO USER A
USER ID : 00001

PARAMETER: PARAMETER A

FIRMWARE: FIRMWARE A/VERSION 1.0

PUBLIC INFORMATION : 00001-0001

CUSTOMIZATION ID : 00001-0001-abcd0111

FIG.6

| SERIAL NUMBER | OWNER | MAKER AREA ||||| USER AREA ||||
|---|---|---|---|---|---|---|---|---|---|---|
| | | CUSTOMIZATION ID | EQUIPMENT NAME | MODEL | PRODUCT DESCRIPTIONS | FIRMWARE | PARAMETER | FACILITY NAME | EQUIPMENT NAME | PURPOSE |
| 10000 | SOLE PROPRIETOR A | 00001-0001-abcd0111 | EQUIPMENT A | MODEL A | EQUIPMENT A 100V 100W | FIRMWARE A/VERSION1.0 | PARAMETER A | FACILITY NAME A | NAME A | PURPOSE A |
| 10001 | SOLE PROPRIETOR B | 00002-0001-efgh0222 | EQUIPMENT A | MODEL A | EQUIPMENT A 100V 100W | FIRMWARE B/VERSION1.0 | PARAMETER B | FACILITY NAME B | NAME B | PURPOSE B |
| 10002 | CORPORA-TION C | 00003-0001-ijkl0333 | EQUIPMENT A | MODEL A | EQUIPMENT A 100V 100W | FIRMWARE C/VERSION1.0 | PARAMETER C | FACILITY NAME C | NAME C | PURPOSE C |
| 10003 | CORPORA-TION D | 00004-0001-mnop0444 | EQUIPMENT A | MODEL A | EQUIPMENT A 100V 100W | FIRMWARE D/VERSION1.0 | PARAMETER D | FACILITY NAME D | NAME D | PURPOSE D |
| .... | .... | .... | .... | .... | .... | .... | .... | .... | .... | .... |

FIG.7

| USER ID | CUSTOMIZATION ID | EQUIPMENT | SETTING INFORMATION | |
| --- | --- | --- | --- | --- |
| | | | PARAMETER | FIRMWARE |
| 00001 | 00001-0001-abcd0111 | MODEL A 100V 100W... | PARAMETER A | FIRMWARE A/Ver1.0 |
| 00001 | 00001-0002-wxyz0222 | MODEL B 100V 100W... | PARAMETER X | FIRMWARE X/Ver2.0 |
| .... | .... | .... | .... | .... |

FIG.8

00001-0001-abcd0111
 PUBLIC      SECRET
INFORMATION INFORMATION

FIG.9

| SERIAL NUMBER | OWNER | EQUIPMENT | CUSTOMIZATION ID | SETTING INFORMATION | |
| --- | --- | --- | --- | --- | --- |
| | | | | PARAMETER | FIRMWARE |
| X00001 | CORPORATION A | MODEL A 100V 100W.... | 00001-0001-abcd0111 | PARAMETER A | FIRMWARE A/Ver1.0 |
| X00002 | CORPORATION A | MODEL A 100V 100W.... | 00001-0001-abcd0111 | PARAMETER X | FIRMWARE A/Ver1.0 |
| .... | .... | .... | .... | .... | .... |

INDUSTRIAL EQUIPMENT MANAGEMENT SYSTEM, INDUSTRIAL EQUIPMENT MANAGEMENT SERVER, INDUSTRIAL EQUIPMENT MANAGEMENT METHOD, AND INFORMATION STORAGE MEDIUM

CROSS-REFERENCE TO RELATED APPLICATIONS

The present disclosure contains subject matter related to that disclosed in Japanese Priority Patent Application JP 2013-224711 filed in the Japan Patent Office on Oct. 29, 2013, the entire contents of which are hereby incorporated by reference.

BACKGROUND

Field of the Invention

The embodiments disclosed herein relate to an industrial equipment management system, an industrial equipment management server, an industrial equipment management method, and an information storage medium.

Description of the Related Art

In Japanese Patent Application Laid-open No. 2011-229359, there is disclosed a system for connecting an engineering tool to an industrial equipment and adjusting or verifying setting information on the industrial equipment. In this system, a user connects an engineering tool to each industrial equipment and verifies the setting information separately, to thereby manage the setting information on each industrial equipment.

SUMMARY

According to one aspect of the present invention, there is provided an industrial equipment management system, including: a receiver configured to receive setting information to be set for an industrial equipment; a generator configured to generate identification information in a case where the setting information is received, and associate the identification information with the setting information; and an equipment manager configured to associate, in a case where setting of the industrial equipment is performed based on the setting information associated with the generated identification information, individual identification information on the industrial equipment with the identification information.

Further, according to one aspect of the present invention, there is provided an industrial equipment management server, including: a receiver configured to receive setting information to be set for an industrial equipment; a generator configured to generate identification information in a case where the setting information is received, and associating the identification information with the setting information; and an equipment manager configured to associate, in a case where setting of the industrial equipment is performed based on the setting information associated with the generated identification information, individual identification information on the industrial equipment with the identification information.

Further, according to one aspect of the present invention, there is provided an industrial equipment management method, including: receiving setting information to be set for an industrial equipment; generating identification information in a case where the setting information is received; associating the identification information with the setting information; and associating, in a case where setting of the industrial equipment is performed based on the setting information associated with the generated identification information, individual identification information on the industrial equipment with the identification information.

Further, according to one aspect of the present invention, there is provided a non-transitory computer-readable information storage medium having stored thereon a program for causing a computer to: receive setting information to be set for an industrial equipment; generate identification information in a case where the setting information is received; associate the identification information with the setting information; and associate, in a case where setting of the industrial equipment is performed based on the setting information associated with the generated identification information, individual identification information on the industrial equipment with the identification information.

Further, according to one aspect of the present invention, there is provided an industrial equipment management system, including: a generating unit configured to generate identification information in a case where the setting information to be set for an industrial equipment is received, and associate the identification information with the setting information; and indicating unit configured to indicate, in a case where setting of the industrial equipment is performed based on the setting information associated with the generated identification information, that the setting of the industrial equipment is performed based on the setting information.

BRIEF DESCRIPTION OF THE DRAWINGS

FIG. 4 is a diagram illustrating an example of a notification screen.

FIG. 6 is a table showing an example of an equipment information database.

FIG. 7 is a table showing an example of a customization information database.

FIG. 8 is a diagram illustrating an example of a customization ID.

FIG. 9 is a table showing an example of a production management database.

DESCRIPTION OF THE EMBODIMENTS

The inventors of the present invention have observed that a user is demanded to know whether or not setting contents of respective industrial equipments are relevant to each other to manage the industrial equipments, but up to now, the user connects a computer to each of the industrial equipments and verifies the setting contents separately, and hence it is complicated to manage settings of the industrial equipments.

Therefore, as a result of intensive research and development aimed at facilitating the management of the settings of the industrial equipment, the inventors of the present invention have reached an industrial equipment management system and the like which are novel and inventive. Now, such an industrial equipment management system and the like are described in detail with reference to an embodiment.

[Industrial Equipment Management System According to the Embodiment of the Present Invention]

Figure 1:
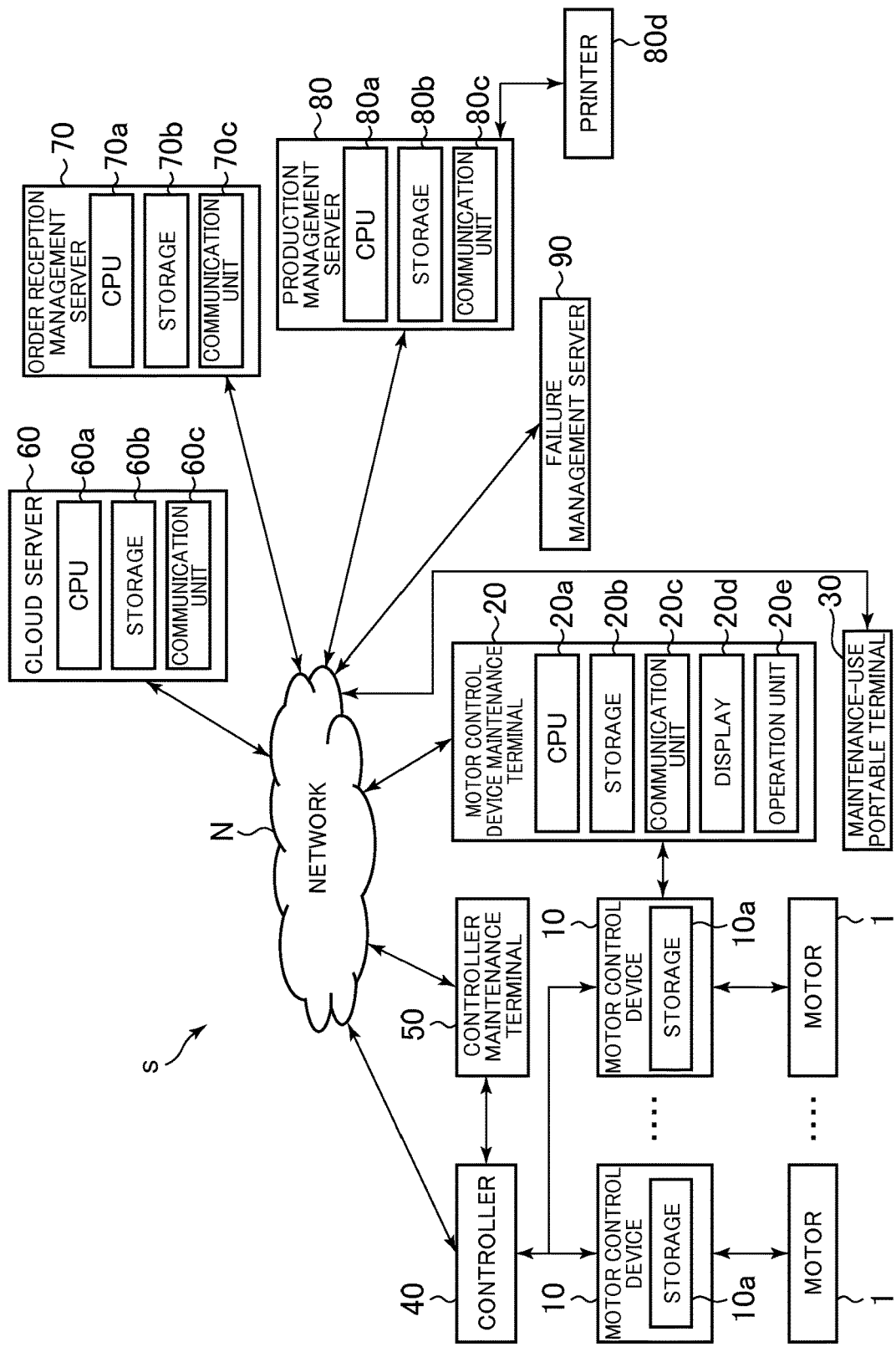
FIG. 1 is a diagram illustrating an example of an overall configuration of an industrial equipment management system according to an embodiment of the present invention.

FIG. 1 is a diagram illustrating an example of an overall configuration of an industrial equipment management system according to the embodiment of the present invention. As illustrated in FIG. 1, the industrial equipment management system S includes a plurality of motors 1, a plurality of motor control devices 10, a motor control device maintenance terminal 20, a maintenance-use portable terminal 30, a controller 40, a controller maintenance terminal 50, a cloud server 60, an order reception management server 70, a production management server 80, and a failure management server 90. The motor control device maintenance terminal 20, the maintenance-use portable terminal 30, the controller 40, the controller maintenance terminal 50, the cloud server 60, the order reception management server 70, the production management server 80, and the failure management server 90 are connected to one another in a manner that allows for data transmission to and data reception from one another via a network N.

This embodiment is described by taking as an example a case where the industrial equipment management system S is used by a maker who sells, and provides aftercare for, various industrial equipments (for example, the motor control devices) and by users who purchase and use those industrial equipments. For instance, users own their respective motors 1, their respective motor control devices 10, the motor control device maintenance terminal 20, the maintenance-use portable terminal 30, the controller 40, and the controller maintenance terminal 50. The maker manages the cloud server 60, the order reception management server 70, the production management server 80, and the failure management server 90.

Each of the motor control devices 10 is formed by integrating a servo amplifier and a control circuit, and operates in accordance with an instruction issued by the controller 40. A storage 10a of each of the motor control devices 10 includes a RAM and an EEPROM, and stores a parameter, firmware, and the like for operating the motor control device 10. In this embodiment, a two-dimensional code including a serial number and public information within a customization ID described later is assigned to each of the motor control devices 10.

The motor control device maintenance terminal 20 is a general computer such as a personal computer, and includes a CPU 20a, a storage 20b, a communication unit 20c, a display 20d, and an operation unit 20e. The storage 20a includes a RAM, a hard disk, and the like to store various programs and data. The CPU 20a executes various kinds of processing based on those programs and data. The communication unit 20c includes a network card, various communication connectors, and the like to hold communication to and from other devices. The display 20d is a liquid crystal display or the like, and displays various screens upon an instruction issued by the CPU 20a. The operation unit 20e is an input device such as a mouse or a keyboard.

The motor control device maintenance terminal 20 can be connected to each of the motor control devices 10, and used by the user to perform maintenance work. For example, the motor control device maintenance terminal 20 writes a parameter designated by the user to the storage 10a of each of the motor control devices 10. Further, the motor control device maintenance terminal 20 downloads firmware selected by the user from the cloud server 60 to be installed onto the storage 10a of each of the motor control devices 10, and updates the installed firmware. In addition, in this embodiment, the motor control device maintenance terminal 20 can display various kinds of information registered in the cloud server 60 on the display 20d.

The maintenance-use portable terminal 30 is a portable information terminal such as a smartphone or a tablet terminal. The user can perform the same maintenance work as the motor control device maintenance terminal 20 by using the maintenance-use portable terminal 30. In this embodiment, the maintenance-use portable terminal 30 includes a camera for photographing the two-dimensional code of the motor control device 10. The maintenance-use portable terminal 30 analyzes an image of the two-dimensional code photographed by the camera, and identifies the serial number or the like serving as an individual identification number of each of the motor control devices 10.

The controller 40 outputs to the motor control devices 10 upper-layer control commands for controlling their respective motors 1 so that the motor control devices 10 are controlled in an integrated manner.

The controller maintenance terminal 50 is a personal computer or the like. The controller maintenance terminal 50 is connected to the controller 40 and is used by a user for maintenance work. For example, the controller maintenance terminal 50 creates a program executed by the controller 40 and a time chart as instructed by a user, and displays various kinds of information registered in the cloud server 60.

The cloud server 60 is a server computer for managing various kinds of information used in the industrial equipment management system S, and includes a CPU 60a, a storage 60b, and a communication unit 60c. Those hardware configurations are the same as those of the CPU 20a, the storage 20b, and the communication unit 20c, respectively, and hence descriptions thereof are omitted. The cloud server 60 manages personal information on each user, information on the industrial equipment, and the like, to provide those pieces of information in response to a request from outside and provide firmware handled by a maker to the user.

The order reception management server 70 is a server computer for managing an order reception situation of the industrial equipment from each user, and includes a CPU 70a, a storage 70b, and a communication unit 70c. Those hardware configurations are the same as those of the CPU 20a, the storage 20b, and the communication unit 20c, respectively, and hence descriptions thereof are omitted. The order reception management server 70 receives an order of the industrial equipment from each user and, based on contents of the order reception, issues a production instruction to the production management server 80.

The production management server 80 is a server computer for managing a production situation of the industrial equipment whose order has been received by the order reception management server 70, and includes a CPU 80a, a storage 80b, and a communication unit 80c. Those hardware configurations are the same as those of the CPU 20a, the storage 20b, and the communication unit 20c, respectively, and hence descriptions thereof are omitted. Here, the production management server 80 is connected to a printer 80d for printing the two-dimensional code on a casing of the industrial equipment produced by the maker, the label, and the like.

The failure management server 90 is a server computer for managing failures in industrial equipments that have been purchased by the respective users.

Programs and pieces of data described as being stored in the respective devices of the industrial equipment management system S may be stored in information storage media connected to the devices, or may be acquired from external devices via the network N. The hardware configurations of the respective devices of the display control system S are not limited to the example given above, and pieces of common hardware can be used for the devices. The same applies to the devices of the display control system S for which a detailed description on the hardware configuration is omitted for the sake of simplifying the description of the embodiment.

In this embodiment, processing executed by the industrial equipment management system S is described by taking an exemplary scene in which the user performs collective order placement for a plurality of motor control devices 10. For example, before the order placement, the user selects a parameter and firmware for the motor control device 10 so that the motor 1 performs a desired operation. Here, the motor control device 10 owned by the user corresponds to a prototype of the motor control device 10 whose order is to be placed by the user, and the user can determine details of customization of the motor control device 10 whose order is to be placed by himself/herself by use of the prototype. Note that, the prototype described here represents an industrial equipment having the same physical configuration (for example, the same model) as that of the industrial equipment whose order is to be placed by the user.

The parameter and the like set for the prototype are uploaded to the cloud server 60, and are associated with identification information (in this embodiment, referred to as "customization ID") for identifying those. After that, when the user designates the customization ID to place an order of the motor control device 10, the motor control device 10 is produced based on the parameter and the firmware associated with the customization ID. Therefore, the motor control device 10 in which the parameter and the firmware adjusted for the prototype are set is delivered, which can eliminate the user's time and labor for separate adjustment. In addition, the produced motor control device 10 is associated with the customization ID used in the order placement, which facilitates product management after the delivery. This technology is described in detail below.

[Functions Implemented by the Industrial Equipment Management System]

Figure 2:
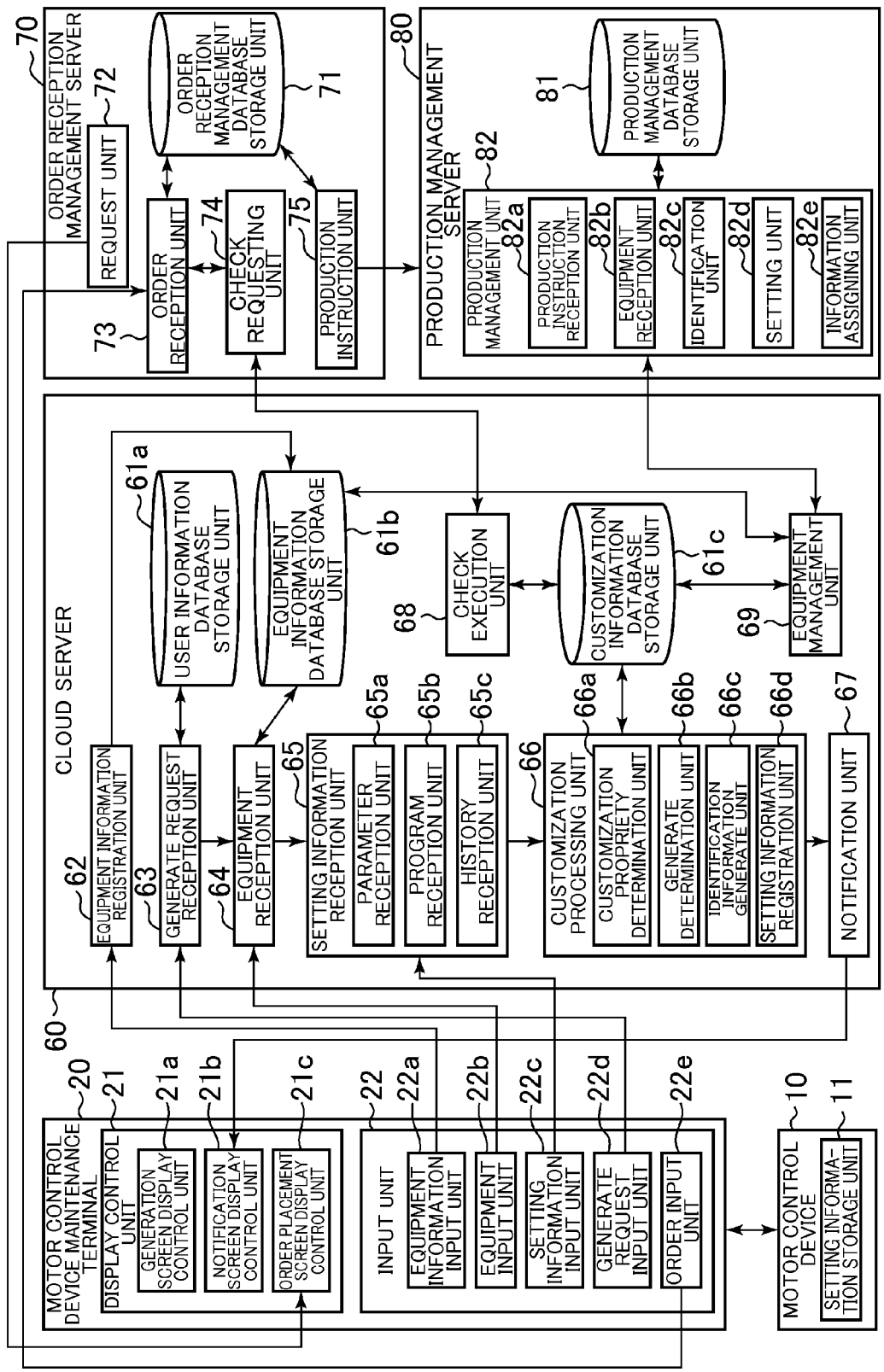
FIG. 2 is a functional block diagram illustrating functions implemented by the industrial equipment management system.

FIG. 2 is a functional block diagram illustrating functions implemented by the industrial equipment management system S. Here, a description is made of functions implemented by the motor control device 10, the motor control device maintenance terminal 20, the cloud server 60, the order reception management server 70, and the production management server 80.

[Functions Implemented by the Motor Control Device]

The motor control device 10 includes a setting information storage unit 11. The setting information storage unit 11 is implemented mainly by the storage 10a. The setting information storage unit 11 stores setting information (for example, parameter and firmware) adjusted by the user. As described above, the motor control device 10 corresponds to the prototype of the industrial equipment to be produced in accordance with the production instruction, and hence the setting information storage unit 11 stores the parameter and the firmware for operating the prototype.

[Functions Implemented by the Motor Control Device Maintenance Terminal]

The motor control device maintenance terminal 20 includes a display control unit 21 and an input unit 22. The display control unit 21 is implemented mainly by the CPU 20a, and the input unit 22 is implemented mainly by the CPU 20a and the operation unit 20e.

[Display Control Unit]

The display control unit 21 displays various screens on the display 20d. Here, the display control unit 21 includes a generation screen display control unit 21a, a notification screen display control unit 21b, and an order placement screen display control unit 21c.

Figure 3:
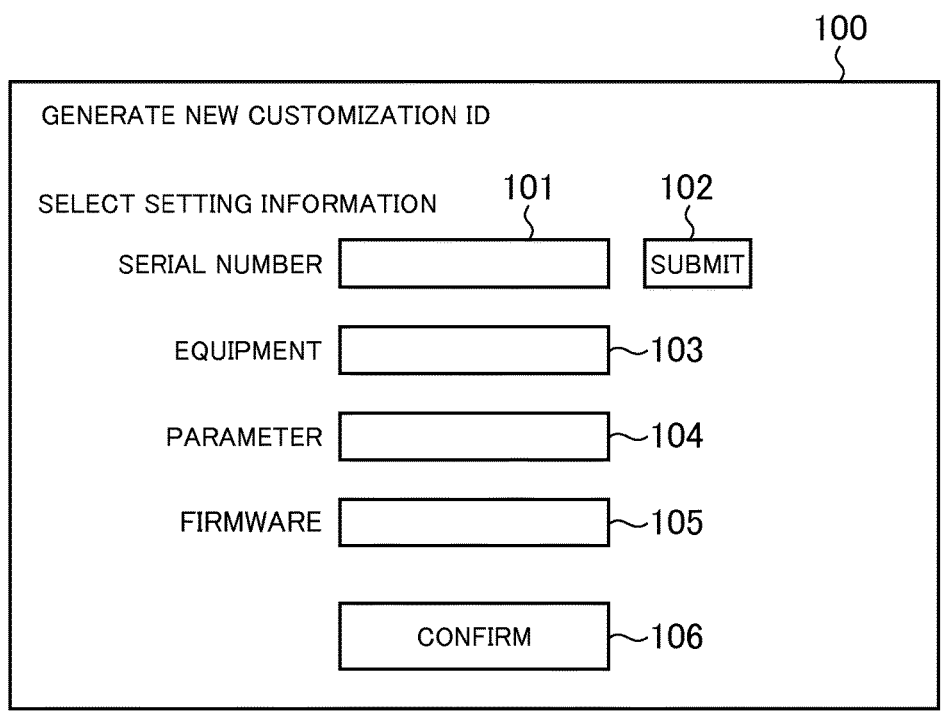
FIG. 3 is a diagram illustrating an example of a generation screen.

The generation screen display control unit 21a displays a generation screen that allows the user to make a generation request for the customization ID. FIG. 3 is a diagram illustrating an example of the generation screen. As illustrated in FIG. 3, a generation screen 100 displays an input form 101 for inputting the serial number of the industrial equipment, a submit button 102 for referring to equipment information corresponding to the input serial number, an input form 103 for inputting information (for example, model and specifications) on a kind of the industrial equipment, an input form 104 for inputting the parameter, an input form 105 for inputting the firmware, and a confirm button 106 that allows the user to make the generation request for the customization ID.

The notification screen display control unit 21b displays a notification screen for notifying of the customization ID generated by an identification information generation unit described later. FIG. 4 is a diagram illustrating an example of the notification screen. As illustrated in FIG. 4, a notification screen 110 displays the customization ID, the public information included in the customization ID, the setting information associated with the customization ID, and the like.

Figure 5:
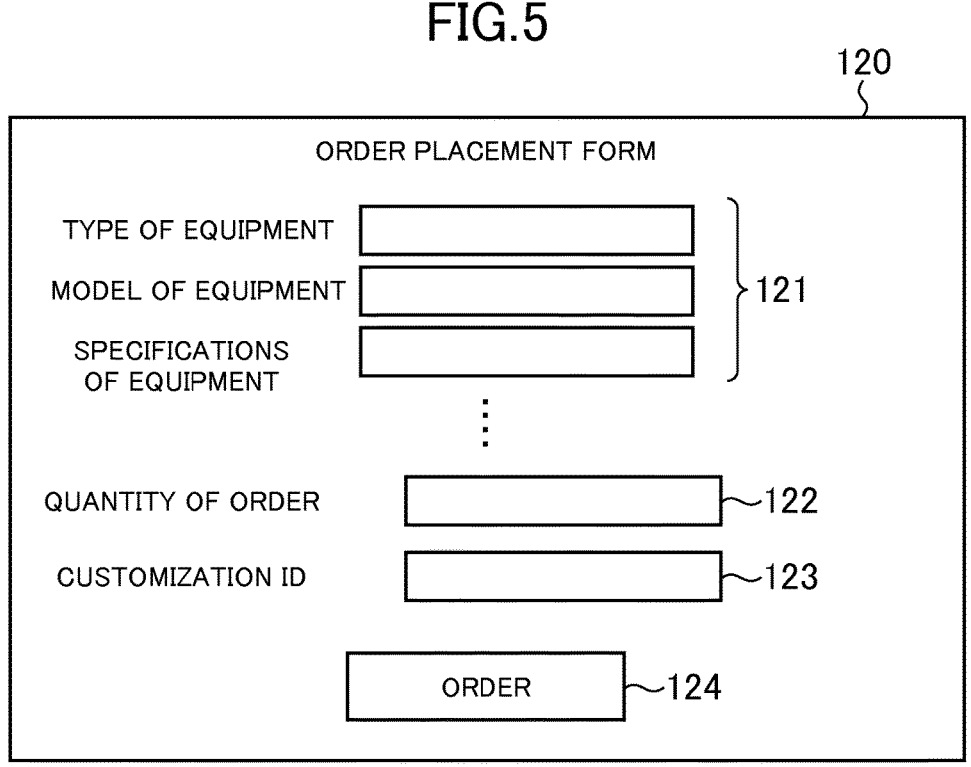
FIG. 5 is a diagram illustrating an example of an order placement screen.

The order placement screen display control unit 21c displays an order placement screen that allows the user to place an order of the industrial equipment. FIG. 5 is a diagram illustrating an example of the order placement screen. As illustrated in FIG. 5, an order placement screen 120 displays an input form 121 for inputting basic information on the industrial equipment whose order is to be placed by the user, an input form 122 for inputting a quantity of industrial equipments whose orders are to be placed, an input form 123 for inputting the customization ID, and an order button 124 for a request for order placement. The user inputs the basic information (for example, type, model, and specifications) on the industrial equipment whose order is to be placed, the user's own user ID, an owner (for example, name of a company to which the user belongs) of the industrial equipment, and the like to the input form 121.

[Input Unit]

The input unit 22 receives various inputs performed by the user. In this embodiment, the input unit 22 includes an equipment information input unit 22a, an equipment input unit 22b, a setting information input unit 22c, a generation request input unit 22d, and an order input unit 22e.

The equipment information input unit 22a receives an input of the equipment information. The equipment information input unit 22a receives an input of the equipment information (for example, file name containing a parameter) to be registered in a user area of an equipment information database described later.

The equipment input unit 22b receives an input of information for identifying the industrial equipment. For example, the equipment input unit 22b receives an input of the serial number of the industrial equipment from the input form 101, and receives an input of the model, the specifications, and the like of the industrial equipment from the input form 103.

The setting information input unit 22c receives an input of the setting information (for example, information on the parameter and the firmware) performed by the user. For example, the setting information input unit 22c receives an input of the setting information whose customization ID is to be generated. That is, the setting information input unit 22c receives an input of the setting information to be registered in a customization information database described later. Here, the setting information input unit 22c receives inputs performed to the input forms 104 and 105.

The generation request input unit 22d receives an input of the generation request for the customization ID performed by the user. In this embodiment, the generation request input unit 22d receives a selection of the confirm button 106 on the generation screen 100.

The order input unit 22e receives an order of the industrial equipment placed by the user. Here, the order input unit 22e receives a selection of the order button 124.

[Functions Implemented by the Cloud Server]

The cloud server 60 includes a user information database storage unit 61a, an equipment information database storage unit 61b, a customization information database storage unit 61c, an equipment information registration unit 62, a generation request reception unit 63, an equipment reception unit 64, a setting information reception unit 65, a customization processing unit 66, a notification unit 67, a check execution unit 68, and an equipment management unit 69. The user information database storage unit 61a, the equipment information database storage unit 61b, and the customization information database storage unit 61c are implemented mainly by the storage 60b, and the other functions are each implemented mainly by the CPU 60a.

[Each Database Storage Unit]

The user information database storage unit 61a stores a user information database for storing various kinds of information on the user. For example, the user information database stores a user ID for uniquely identifying a user and personal information on each user. When the user performs a predetermined user registration, a new record is created in the user information database, and the information input by the user who has performed the user registration is stored in the record. The information stored in the user information database may be changed in accordance with each user's operation.

The equipment information database storage unit 61b stores the equipment information database for storing various kinds of information on the industrial equipment. FIG. 6 is a table showing an example of the equipment information database. As shown in FIG. 6, the equipment information database stores the serial number serving as individual identification information on the industrial equipment, an owner thereof, and the equipment information. Here, the equipment information includes a maker area serving as a data area managed by the maker and a user area serving as a data area managed by each user.

The maker area stores information unique to the industrial equipment, and stores, for example, the customization ID used at a time of production of the industrial equipment, various kinds of information (for example, industrial equipment name, model, and industrial equipment descriptions relating to the specifications) for identifying the industrial equipment, kind and version information on firmware, and the like. The kind and version information on the firmware within the maker area is appropriately changed when the firmware is downloaded or updated. On the other hand, the other information is not updated because of not being changed in principle after the industrial equipment is purchased. Note that, the customization ID stored in the maker area may be viewed only by a specific user.

The user area stores the equipment information input by the user, and stores, for example, the parameter adjusted by the user, a name of a facility in which the industrial equipment is to be used, a name given by the user, a purpose of use of the industrial equipment, and the like. Note that, the user area may store actual data on the parameter, or may store only the file name of the parameter and a storage location thereof with the actual data on a parameter file stored in another storage area. Further, each item input to the user area may be able to be freely edited for each user.

The customization information database storage unit 61c stores the customization information database for storing information on customization of the industrial equipment. FIG. 7 is a table showing an example of the customization information database. As shown in FIG. 7, the customization information database stores the user ID of the user who has made the generation request for the customization ID, the customization ID, the information (for example, the serial number and model) on the industrial equipment designated by the user, and the setting information in association with one another.

[Equipment Information Registration Unit]

The equipment information registration unit 62 registers the equipment information in the equipment information database. For example, when the industrial equipment whose order has been placed by the user is produced, the equipment information registration unit 62 creates a new record in the equipment information database, and stores the serial number of the industrial equipment, the owner thereof, and the respective pieces of information within the maker area. For example, the equipment information registration unit 62 acquires those pieces of information from a production management database described later. Note that, the data may not be stored in the user area immediately after the industrial equipment is produced.

Further, in this embodiment, the setting information stored in the setting information storage unit 11 of the motor control device 10 can be uploaded, and hence the equipment information registration unit 62 registers the uploaded setting information in the equipment information database. In this case, the equipment information registration unit 62 repeatedly acquires the setting information, and may register a history of the setting information in the equipment information database. For example, the equipment information registration unit 62 stores the setting information on the industrial equipment in time series. That is, the equipment information registration unit 62 may store the history of the parameter for the motor control device 10 adjusted by the user in the user area corresponding to the serial number of the motor control device 10, or may store the history of the kind and version of the firmware installed on the motor control device 10 in the maker area corresponding to the serial number of the motor control device 10.

Further, in this embodiment, not only the motor control device 10 but also a plurality of industrial equipments such as the motor 1 and the controller 40 exist, and moreover, each of the industrial equipments exhibits a plurality of kinds (for example, model), and hence the equipment information registration unit 62 acquires the equipment information on each of the plurality of industrial equipments (for example, equipment information on each of the industrial equipments of the plurality of kinds), and registers the equipment information in the equipment information database in association with the each of the plurality of industrial equipments. In addition, in this embodiment, the motor control device 10 owned by the user corresponds to the prototype, and hence the equipment information registration unit 62 acquires the parameter adjusted for the prototype, and registers the parameter in the equipment information database.

[Generation Request Reception Unit]

The generation request reception unit 63 receives the generation request for the customization ID (identification information) associated with the setting information received by the setting information reception unit 65. In this embodiment, the generation request reception unit 63 receives a notification that the user has selected the confirm button 106.

[Equipment Reception Unit]

The equipment reception unit 64 receives designation of at least one of the plurality of industrial equipments. For example, the equipment reception unit 64 receives the serial number, kind (for example, model), and the like of the industrial equipment whose customization ID is to be generated.

[Setting Information Reception Unit]

The setting information reception unit 65 receives the setting information to be set for the industrial equipment (for example, motor control device 10). In this embodiment, the serial number, kind (for example, model), and the like of the industrial equipment are designated on the generation screen 100, and hence the setting information reception unit 65 receives the setting information on the industrial equipment designated by the user. Here, the setting information reception unit 65 includes a parameter reception unit 65*a*, a program reception unit 65*b*, and a history reception unit 65*c*.

The parameter reception unit 65*a* receives the parameter for the industrial equipment that can be adjusted by the user. For example, the parameter reception unit 65*a* receives the parameter input to the input form 104.

The program reception unit 65*b* receives the kind and version information on the firmware. For example, the program reception unit 65*b* receives the firmware input to the input form 105.

The history reception unit 65*c* receives the designation of anyone of a plurality of pieces of the setting information included in the history registered in the equipment information database. That is, when the history of the parameter or the firmware is registered in the industrial equipment having the serial number designated by the user, the history reception unit 65*c* receives the designation of anyone of the parameter and the firmware included in the history.

[Customization Processing Unit]

The customization processing unit 66 performs processing relating to the update of the customization information database. For example, the customization processing unit 66 includes a customization propriety determination unit 66*a*, a generation determination unit 66*b*, an identification information generation unit 66*c*, and a setting information registration unit 66*d*.

The customization propriety determination unit 66*a* determines whether or not the customization can be performed with the setting information received by the setting information reception unit 65. For example, a condition indicating a reference as to whether or not the customization can be performed is defined for each industrial equipment, and the customization propriety determination unit 66*a* determines whether or not the setting information received by the setting information reception unit 65 satisfies the condition. The condition represents a range of the parameter or the kind and version of the firmware that allows the customization to be performed.

The generation determination unit 66*b* determines whether or not to cause the identification information generation unit 66*c* to generate the customization ID based on the setting information received by the setting information reception unit 65 and the setting information associated with the already-generated customization ID.

In this embodiment, the generation determination unit 66*b* determines whether or not a difference (deviation) between the setting information received by the setting information reception unit 65 and the setting information associated with the already-generated customization ID is within the reference (threshold value). For example, the generation determination unit 66*b* determines whether or not a difference between a numerical value indicated by the parameter received by the setting information reception unit 65 and a numerical value indicated by the parameter associated with the already-generated customization ID is within the reference. Note that, this reference may be defined by an administrator in advance or may be able to be changed by the user.

In this case, when it is determined by the generation determination unit 66*b* that the difference is within the reference, the identification information generation unit 66*c* described later does not generate the customization ID, and generates the customization ID when it is determined by the generation determination unit 66*b* that the difference is not within the reference. That is, the generation determination unit 66*b* determines that, even in a case where there is a difference in the setting information to some extent, there is no need to generate a new customization ID when the difference is relatively small.

Further, for example, the generation determination unit 66*b* may determine whether or not the setting information received by the setting information reception unit 65 and the setting information associated with the already-generated customization ID are the same. That is, the generation determination unit 66*b* determines whether or not the same setting information as the setting information received by the setting information reception unit 65 already exists in the customization information database. In this case, the identification information generation unit 66*c* described later does not generate the customization ID when it is determined by the generation determination unit 66*b* that the two kinds of the setting information are the same, and generates the customization ID when it is determined that the two kinds of the setting information are not the same.

When the setting information (for example, parameter and firmware) is received, the identification information generation unit 66*c* generates the customization ID and associates the customization ID with the setting information. In this embodiment, the identification information generation unit 66*c* generates the customization ID when the generation request is received. Here, the association corresponds to the storing of data in the identical record within the customization information database.

FIG. 8 is a diagram illustrating an example of the customization ID. As illustrated in FIG. 8, in this embodiment, the customization ID includes the public information unique to the customization ID and secret information used for producing the industrial equipment based on the setting information associated with the customization ID. That is, the customization ID is information obtained by combining the public information and the secret information.

The public information includes, for example, information (user ID or ID of a corporation to which the user belongs; "00001" in the example of FIG. 8) for identifying the user and a symbol string ("0001" in the example of FIG. 8) that can be designated by the user himself/herself. The symbol string may be able to be input through, for example, the generation screen 100. The secret information is a symbol string ("abcd0111" in the example of FIG. 8) generated by a given method. For example, the identification information generation unit 66c may generate the secret information from a character string selected at random. In this embodiment, in order to place an order by using the setting information registered in the customization information database, the user needs to possess the customization ID associated with the same setting information. Therefore, one who possesses only the public information is not allowed to place an order by using the setting information, and needs to possess the customization ID including the secret information.

In this embodiment, the identification information generation unit 66c associates the generated customization ID with the industrial equipment received by the equipment reception unit 64 and the setting information received by the setting information reception unit 65. Here, the identification information generation unit 66c performs the association by storing the customization ID and the serial number, the model, and the like of the industrial equipment in the same record as that of the setting information registered by the setting information registration unit 66d.

The setting information registration unit 66d registers the setting information (for example, setting information stored in the setting information storage unit 11) received by the setting information reception unit 65 in the customization information database. For example, the setting information registration unit 66d creates a new record in the customization information database. This record stores the user ID of the user who has made the generation request for the customization ID, the customization ID generated by the identification information generation unit 66c, the industrial equipment (for example, serial number and model) received by the equipment reception unit 64, and the setting information received by the setting information reception unit 65.

Further, in this embodiment, not only the motor control device 10 but also a plurality of industrial equipments such as the motor 1 and the controller 40 exist, and moreover, each of the industrial equipments exhibits a plurality of kinds (for example, model), and hence the setting information registration unit 66d acquires the equipment information on each of the plurality of industrial equipments (for example, equipment information on each of the industrial equipments of the plurality of kinds), and registers the equipment information in the customization information database in association with the each of the plurality of industrial equipments. In addition, in this embodiment, the motor control device 10 owned by the user corresponds to the prototype, and hence the setting information registration unit 66d acquires the parameter adjusted for the prototype, and registers the parameter in the customization information database.

[Notification Unit]

The notification unit 67 notifies of the customization ID generated by the identification information generation unit 66c. Note that, a method of notifying of the customization ID by the notification unit 67 is not limited to a method using the notification screen 110, but the customization ID may be notified of through electronic mail or the like.

[Check Execution Unit]

The check execution unit 68 determines whether or not the customization ID received from a check requesting unit 74 described later (that is, customization ID input when the user places an order) exists in the customization information database. In other words, the check execution unit 68 determines whether or not the user who has requested for the order placement possesses the secret information of the customization ID.

[Equipment Management Unit]

When setting (production) of the industrial equipment is performed based on the setting information associated with the customization ID, the equipment management unit 69 associates the serial number (individual identification number) of the industrial equipment with the customization ID. Here, the equipment management unit 69 performs the association by storing the customization ID in the maker area corresponding to the serial number of the produced industrial equipment. Further, in this embodiment, the serial number and kind (for example, model) of the industrial equipment are designated on the generation screen 100, and hence the equipment management unit 69 performs the association when the setting of the industrial equipment associated with the customization ID is performed based on the setting information associated with the customization ID.

[Functions Implemented by the Order Reception Management Server]

The order reception management server 70 includes an order reception management database storage unit 71, a request unit 72, an order reception unit 73, the check requesting unit 74, and a production instruction unit 75. The order reception management database storage unit 71 is implemented mainly by the storage 70b, and the other functions are each implemented mainly by the CPU 70a.

[Order Reception Management Database Storage Unit]

The order reception management database storage unit 71 stores an order reception management database relating to the industrial equipment whose order has been received by the maker. The order reception management database stores the user ID of the user who has placed the order, the owner of the industrial equipment, each piece of information on the industrial equipment whose order has been received, and the customization ID.

[Request Unit]

The request unit 72 requests the user to input the customization ID. Here, the request unit 72 requests for an input of the customization ID in the input form 123 on the order placement screen 120. In other words, the request unit 72 requests the user inputting the customization ID for the secret information included in the customization ID.

[Order Reception Unit]

The order reception unit 73 receives contents of the order input by the user. The order reception unit 73 receives the contents input by the user through the order placement screen 120.

[Check Requesting Unit]

The check requesting unit 74 requests the cloud server 60 to determine whether or not the customization ID input by the user in response to the request made by the request unit 72 is stored in the customization information database. In other words, the check requesting unit 74 requests for determination as to whether or not the user possesses the secret information of the customization ID.

[Production Instruction Unit]

The production instruction unit 75 transmits the production instruction for the industrial equipment whose order has been received by the user to the production management server 80. Here, the production instruction unit 75 transmits the respective pieces of information stored in the order reception management database to the production management server 80.

[Functions Implemented by the Production Management Server]

The production management server 80 includes a production management database storage unit 81 and a production management unit 82. The production management database storage unit 81 is implemented mainly by the storage 80*b*, and the production management unit 82 is implemented mainly by the CPU 80*a*.

[Production Management Database Storage Unit]

The production management database storage unit 81 stores a production management database for storing various kinds of information on the industrial equipment to be produced by the maker. FIG. 9 is a table showing an example of the production management database. As shown in FIG. 9, the production management database stores the serial number assigned to the industrial equipment, the owner of the industrial equipment, the various kinds of information (for example, model and specifications of the industrial equipment) on the industrial equipment, the customization ID to be used at the time of the production, and the setting information associated with the customization ID.

[Production Management Unit]

The production management unit 82 centrally manages the production of the industrial equipment. Here, the production management unit 82 includes a production instruction reception unit 82*a*, an equipment reception unit 82*b*, an identification unit 82*c*, a setting unit 82*d*, and an information assigning unit 82*e*.

The production instruction reception unit 82*a* receives the production instruction for the industrial equipment from the order reception management server 70. Here, the production instruction reception unit 82*a* receives the production instruction for the industrial equipment whose order has been received by the order reception management server 70, and also receives the customization ID to be used for the production of the industrial equipment along with the production instruction. Further, the industrial equipment is not produced only once by using the customization ID, and hence the production instruction reception unit 82*a* can repeatedly receive the production instruction for producing the industrial equipment by using the customization ID.

The equipment reception unit 82*b* receives the designation of the industrial equipment to be produced. For example, the equipment reception unit 82*b* receives the information (for example, model and specifications of the industrial equipment) on the industrial equipment whose order has been received by the order reception management server 70 from the order reception management server 70.

When the production instruction is received, the identification unit 82*c* identifies the setting information on the industrial equipment to be produced in accordance with the production instruction based on the setting information (for example, parameter for prototype) registered in the cloud server 60. The identification unit 82*c* transmits an acquisition request for the setting information associated with the customization ID received at a time of issuing the production instruction to the cloud server 60, acquires the setting information associated with the customization ID from the customization information database storage unit 61*c*, and stores the setting information in the production management database.

Note that, as in this embodiment, when the equipment information database includes the history of the setting information, the user designates any one of the histories to generate the customization ID, and hence the identification unit 82*c* performs the identification based on a designated piece of the setting information among the plurality of the pieces of the setting information included in the history. Further, in this embodiment, not only the motor control device 10 but also different kinds of industrial equipment can be produced, and hence the identification unit 82*c* performs the identification based on the setting information associated with the designated industrial equipment (industrial equipment to be production target) among the pieces of the setting information registered in the customization information database. In addition, in this embodiment, the production instruction is repeatedly received, and hence the identification unit 82*c* performs the identification based on the setting information registered in the customization information database each time the production instruction is received.

Note that, the production management unit 82 may receive not only the information described above but also each piece of information (for example, owner of the industrial equipment) stored in the production management database from the order reception management server 70. In addition, the production management unit 82 may assign the serial number to the industrial equipment to be produced in accordance with a predetermined numbering rule.

The setting unit 82*d* performs the setting of the industrial equipment to be produced in accordance with the production instruction based on the setting information identified by the identification unit 82*c*. For example, when the user designates the customization ID to place an order of a plurality of industrial equipments, the setting unit 82*d* performs the setting of those plurality of industrial equipments based on the same setting information. Note that, the setting unit 82*d* may write the setting information identified by the identification unit 82*c* directly to the industrial equipment serving as the production target, or may transmit a write instruction to an equipment to which the setting information is to be written.

When the setting of the industrial equipment is performed based on the setting information associated with the customization ID generated by the identification information generation unit 66*c*, the information assigning unit 82*e* assigns the public information within the customization ID to the industrial equipment without assigning the secret information. For example, the information assigning unit 82*e* assigns the two-dimensional code, which includes the public information within the customization ID without including the secret information, to the industrial equipment. Note that, a method of assigning the public information is not limited thereto, and alternatively, for example, the information assigning unit 82*e* may assign the public information by printing the symbol string indicating the public information instead of the two-dimensional code or writing the public information to a memory of the industrial equipment serving as the production target.

When the industrial equipment is produced, the production management unit 82 transmits the serial number of the product, the owner thereof, each piece of information (for example, model number) on the industrial equipment, and the customization ID used at the time of the production to the equipment management unit 69. The equipment management unit 69 receives those pieces of information, and registers the pieces of information in the equipment information database.

[Processing Executed in the Industrial Equipment Management System]

Next, processing executed in the industrial equipment management system S is described. When the processing described below is executed, the respective functional blocks are implemented. Here, customization processing for registering data in the customization information database and production management processing for producing and managing the industrial equipment serving as the production target are described as an example of the processing executed in the industrial equipment management system S.

[Customization Processing]

Figure 10:
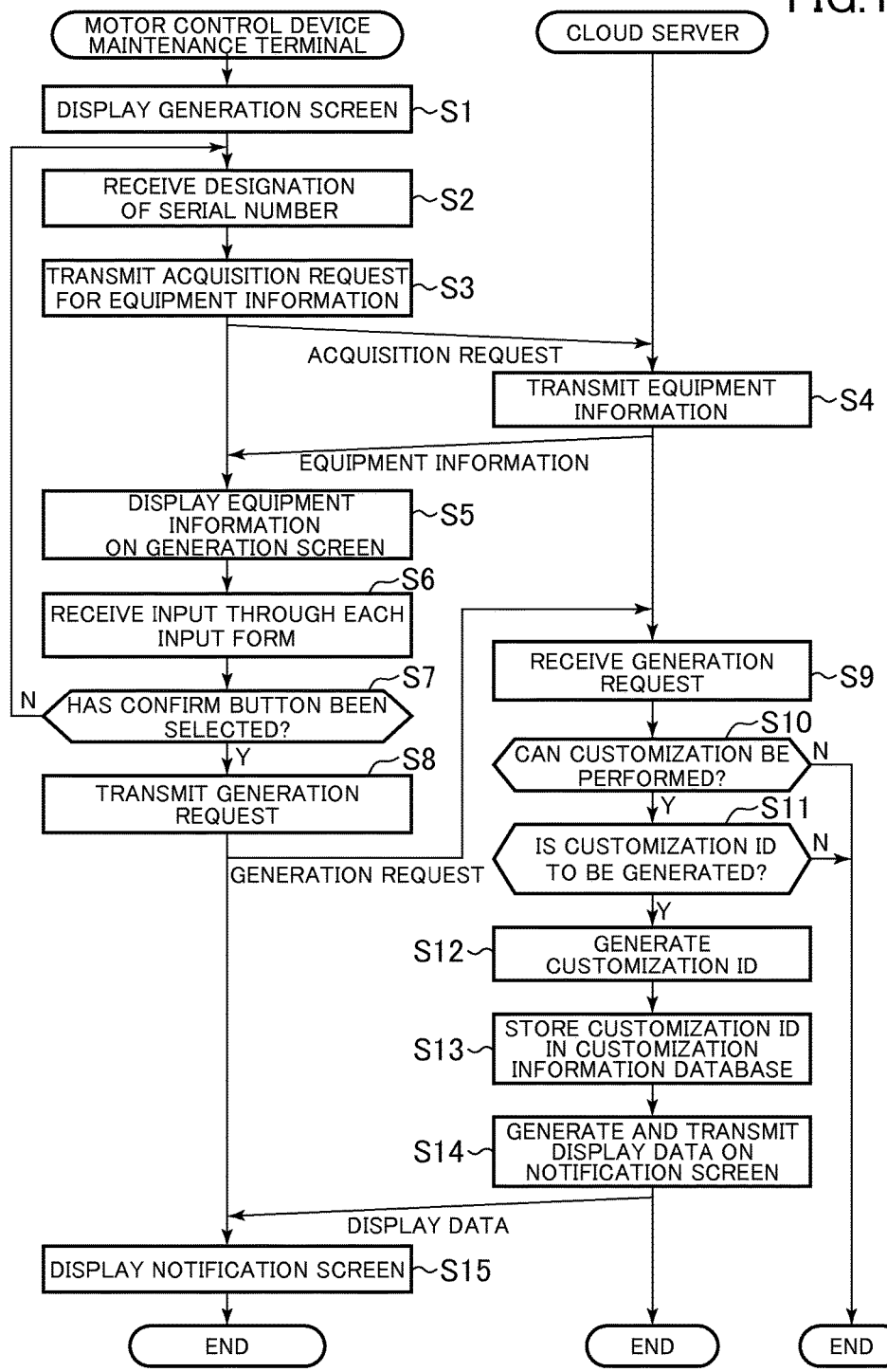
FIG. 10 is a diagram illustrating an example of customization processing.

FIG. 10 is a diagram illustrating an example of the customization processing. Note that, it is assumed that the equipment information on each industrial equipment is registered in the equipment information database when the customization processing is executed. For example, it is assumed that the parameter and the firmware adjusted for the prototype by the user have been uploaded to the equipment information database.

As illustrated in FIG. 10, first, on the motor control device maintenance terminal 20, the CPU 20a displays the generation screen 100 on the display 20d (S1). The CPU 20a receives the designation of the serial number of the industrial equipment (S2). In Step S2, the user uses the operation unit 20e to input, to the input form 101, the serial number the equipment information corresponding to which is to be referred to.

When the submit button 102 is selected after the serial number is input to the input form 101, the CPU 20a transmits the acquisition request for the equipment information associated with the serial number to the cloud server 60 (S3). Note that, when the motor control device maintenance terminal 20 performs communications to/from the cloud server 60, the user ID is transmitted when the need arises.

On the cloud server 60, when the acquisition request for the equipment information is received, the CPU 60a transmits the equipment information associated with the serial number input by the user to the motor control device maintenance terminal 20 (S4). In Step S4, the CPU 60a refers to the equipment information database to acquire and transmit the equipment information corresponding to the serial number designated by the user. Note that, in Step S4, when the record includes the history of the setting information, the CPU 60a transmits a plurality of pieces of setting information included in the history.

On the motor control device maintenance terminal 20, when receiving the equipment information from the cloud server 60, the CPU 20a displays the received equipment information on the generation screen 100 (S5). In Step S5, each piece of information (for example, model) on the industrial equipment associated with the serial number input by the user is displayed on the input form 103, and the parameter and the firmware for the industrial equipment are displayed in the input forms 104 and 105, respectively. Note that, when the histories of the setting information are received, the histories are displayed in the input forms 104 and 105. The user designates any one of the pieces of setting information included in each of the histories through each of the input forms 104 and 105.

The CPU 20a receives an input performed to each input form (S6). In Step S6, for example, the input of the parameter may be received through the input form 104, and the input of the firmware may be received through the input form 105. For example, the change of the parameter may be received through the input form 104, and the change of the firmware may be received through the input form 105. In addition, without inputting the serial number to the input form 101, the user may input the model or the like of the industrial equipment to the input form 103, and may input the parameter and the firmware directly to the input forms 104 and 105, respectively. Note that, when the user inputs the serial number to the input form 101 to display the parameter and the firmware for the industrial equipment corresponding to the serial number in the input forms 104 and 105, respectively, inputs to those input forms 104 and 105 may be inhibited from been received. In addition, when the user performs predetermined inputs to the input forms 104 and 105, the CPU 20a may acquire the information on the parameter and the firmware stored in the storage 10a of the motor control device 10 connected to the motor control device maintenance terminal 20.

The CPU 20a determines whether or not the confirm button 106 has been selected (S7). When it is not determined that the confirm button 106 has been selected (N in S7), the procedure returns to the processing of Step S2, and the input of the serial number and the designation of the setting information are repeated.

On the other hand, when it is determined that the confirm button 106 has been selected (Y in S7), the CPU 20a transmits a generation request for the customization ID to the cloud server 60 along with input contents on the generation screen 100 (S8).

On the cloud server 60, the CPU 60a receives the generation request for the customization ID and the input contents on the generation screen 100 from the motor control device maintenance terminal 20 (S9). The CPU 60a determines whether or not the customization can be performed with the contents designated by the user (S10). For example, the storage 60b stores data indicating the condition serving as the reference for determining whether or not the customization can be performed, and the CPU 60a determines whether or not the setting contents designated by the user satisfy the condition.

When it is determined that the customization cannot be performed (N in S10), this processing is brought to an end, and the generation of the customization ID and the registration of the setting information are not performed. In this case, an error message indicating that the customization cannot be performed with the contents designated by the user may be displayed on the generation screen 100.

On the other hand, when it is determined that the customization can be performed (Y in S10), the CPU 60a determines whether or not to generate the customization ID based on the setting information designated by the user and the setting information already stored in the customization information database (S11). In Step S11, the CPU 60a determines whether or not a difference between the setting information designated by the user and the setting information already stored in the customization information database is within the reference, or determines whether or not those are the same. The user may be allowed to select which determination processing is to be executed. In addition, among a plurality of items (for example, numerical value of a gain) included in the parameter, only a specific item may be used as a determination target in Step S11.

When it is determined that the customization ID is not to be generated (N in S11), this processing is brought to an end without performing the generation of the customization ID and the registration of the setting information. In this case, an error message indicating that the customization ID has already been generated with the setting information designated by the user may be displayed on the generation screen 100.

On the other hand, when it is determined that the customization ID is to be generated (Y in S11), the CPU 60*a* generates the customization ID associated with the setting information (S12). In Step S12, the CPU 60*a* generates the public information including the user ID. Then, the CPU 60*a* performs predetermined symbol string generation processing to generate the secret information. The CPU 60*a* couples the public information and the secret information to each other, to generate the customization ID.

The CPU 60*a* stores the customization ID generated in Step S12 in the customization information database in association with the setting information and the like designated by the user (S13). In Step S13, the CPU 60*a* generates a new record in the customization information database, and stores the user ID, the customization ID, the information (for example, serial number and model) on the industrial equipment, and the setting information in the record.

The CPU 60*a* generates display data on the notification screen 110 including the generated customization ID, and transmits the display data to the motor control device maintenance terminal 20 (S14).

When the motor control device maintenance terminal 20 receives the display data, the CPU 20*a* displays the notification screen 110 on the display 20*d* (S15), and this processing is brought to an end. After that, the user is allowed to place an order by using the customization ID. Note that, the notification screen 110 may be allowed to be displayed on the display 20*d* in accordance with the user's operation at an arbitrary timing.

[Production Management Processing]

Figure 11:
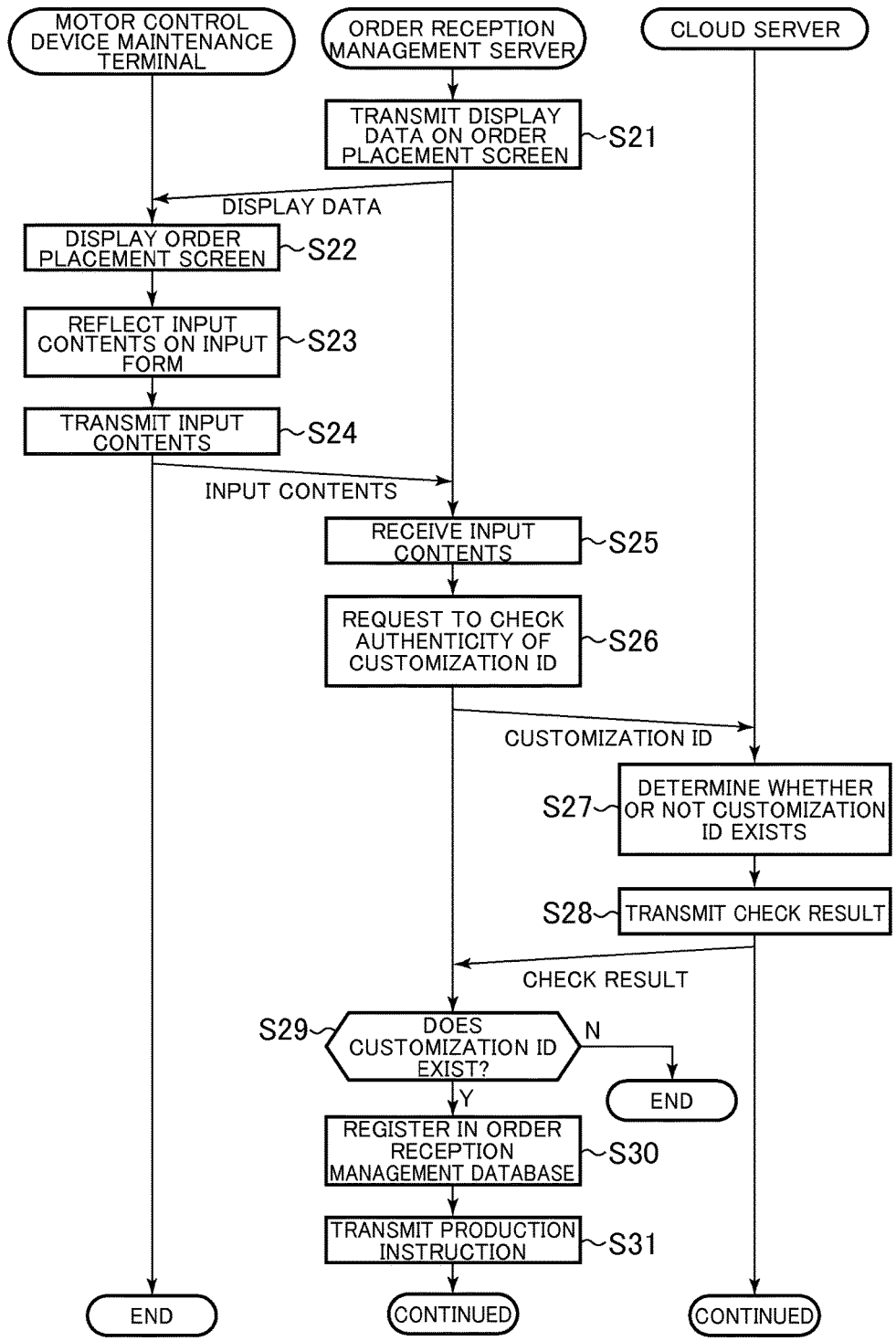
FIG. 11 is a diagram illustrating an example of production management processing.
Figure 12:
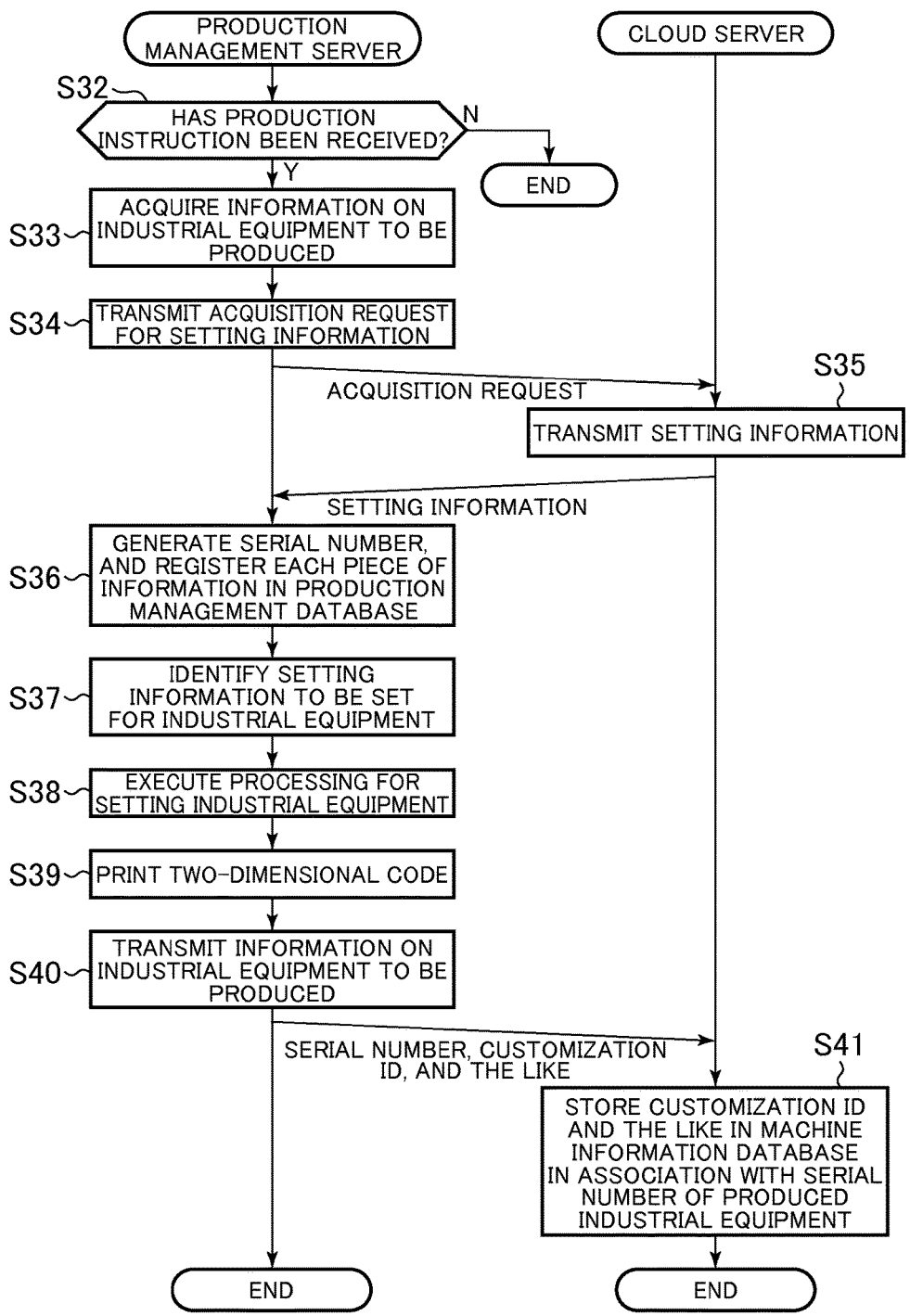
FIG. 12 is a diagram illustrating an example of the production management processing.

FIG. 11 and FIG. 12 are each a diagram illustrating an example of the production management processing. First, as illustrated in FIG. 11, the order reception management server 70 transmits the display data on the order placement screen 120 including the input form 123 for requesting the input of the customization ID to the motor control device maintenance terminal 20 (S21).

On the motor control device maintenance terminal 20, the CPU 20*a* displays the order placement screen 120 on the display 20*d* (S22). The CPU 20*a* reflects the contents input by the user on the respective input forms 121 to 123 (S23). When the order button 124 is selected, the CPU 20*a* transmits the contents input on the order placement screen 120 to the order reception management server 70 (S24).

On the order reception management server 70, the CPU 70*a* receives the input contents (S25). The CPU 70*a* requests the cloud server 60 to check authenticity of the customization ID input by the user (S26).

On the cloud server 60, the CPU 60*a* determines whether or not the customization ID exists in the customization information database (S27). Note that, in Step S27, the CPU 60*a* may determine whether or not the customization information database includes the record that matches both the user ID of the user who has performed the input and the customization ID. The CPU 60*a* transmits a check result obtained in Step S27 to the order reception management server 70 (S28).

On the order reception management server 70, the CPU 70*a* refers to the check result received from the cloud server 60 to determine whether or not the customization ID exists (S29). When it is determined that the customization ID does not exist (N in S29), this processing is brought to an end. In this case, an error message indicating that the customization ID is wrong and hence the order of the product cannot be placed may be displayed on the display 20*d*. For example, the subsequent processing is not executed when only the public information within the customization ID is input, and hence the order placement using the customization ID cannot be performed.

On the other hand, when it is determined that the customization ID exists (Y in S29), the CPU 70*a* registers the contents of the user's order placement in the order reception management database (S30). In Step S30, the CPU 70*a* registers the contents received in Step S25 in the order reception management database. After that, the CPU 70*a* transmits the production instruction to the production management server 80 at an arbitrary timing (S31). In Step S31, the CPU 70*a* transmits the contents registered in the order reception management database and an instruction to produce the industrial equipment with the contents to the production management server 80.

With reference to FIG. 12, on the production management server 80, the CPU 80*a* determines whether or not the production instruction has been received from the order reception management server 70 (S32). When it is determined that the production instruction has been received (Y in S32), the CPU 80*a* receives the information on the industrial equipment to be produced (S33). In Step S33, the CPU 80*a* receives the basic information (for example, owner, model, and specifications) on the industrial equipment to be produced, the customization ID to be used at the time of the production, and the like from the order reception management server 70.

The CPU 80*a* transmits the acquisition request for the setting information associated with the customization ID received along with the production instruction to the cloud server 60 (S34).

On the cloud server 60, when receiving the acquisition request, the CPU 60*a* refers to the customization information database to transmit the setting information associated with the customization ID for which the acquisition request has been made to the production management server 80 (S35). In Step S35, the CPU 60*a* transmits the setting information stored in the record corresponding to the customization ID for which the acquisition request has been made within the customization information database.

On the production management server 80, when receiving the setting information, the CPU 80*a* generates the serial number of the industrial equipment to be produced, and registers each piece of information (here, information received along with the production instruction and setting information received from the cloud server 60) in the production management database (S36).

The CPU 80*a* identifies the setting information and the like to be set for the industrial equipment serving as the production target based on the contents registered in the production management database (S37). The CPU 80*a* executes processing for setting the industrial equipment based on the contents identified in Step S37 (S38). In Step S38, the CPU 80*a* may write the setting information directly to the industrial equipment serving as the production target, or may transmit a write instruction to an equipment to which the setting information is to be written.

The CPU 80*a* generates the two-dimensional code including the public information without including the secret information, and prints the two-dimensional code through the printer 80*d* (S39). In Step S39, for example, the CPU 80*a* generates the image data on the two-dimensional code including the serial number of the product and the public information within the customization ID without including the secret information, and issues the print instruction for the image data to the printer 80*d*. The printer 80*d* prints the two-dimensional code on the casing of the product serving as the production target, or prints the two-dimensional code on the label to be attached to the product serving as the production target.

The CPU 80a transmits the information on the industrial equipment to be produced to the cloud server 60 (S40). In Step S40, the CPU 80a transmits the serial number of the industrial equipment serving as the production target, the basic information (for example, owner, model, and specifications) on the industrial equipment serving as the production target, and the customization ID used at the time of the production to the cloud server 60.

On the cloud server 60, when acquiring the information from the production management server 80, the CPU 60a stores the customization ID and the like in the equipment information database in association with the serial number of the produced industrial equipment (S41). In Step S41, the CPU 60a creates a new record in the equipment information database, and stores the received information in the record.

[Conclusion Regarding the Production of the Industrial Equipment]

According to the industrial equipment management system S described above, the industrial equipment can be produced based on the setting information registered in the cloud server 60, which allows the user to alleviate the time and labor to adjust the settings of the industrial equipment. For example, even the same industrial equipment exhibits a purpose of use and a use environment which differ depending on the user, and hence when the product is produced based on standard settings of the maker, the standard settings are not always suitable for the user. In this case, the user needs to perform the adjustment work separately, but in the industrial equipment management system S, it is possible to produce the industrial equipment based on the setting information as requested by the user in advance, which can omit the time and labor to perform the adjustment work separately. In particular, in the field of the industrial equipment, the order of a large number of customized products is often placed ex post facto, and the industrial equipment for which a common parameter and common firmware are set is mass-produced in some cases, and hence the industrial equipment management system S can effectively alleviate the user's time and labor.

Further, the industrial equipment can be produced by using the same setting information as stored in the storage of the industrial equipment, and hence it is possible to mass-produce the industrial equipment based on the parameter and firmware adjusted by the user in actuality. For example, the industrial equipment can be at least customized even when the user places an order by manually inputting the parameter and the firmware, but in this case, there is a fear that a human input error may occur. In particular, mass production may be necessary in the field of the industrial equipment as described above, and hence when the order is placed without noticing an occurrence of the input error, a large volume of industrial equipments having a setting error may be produced. In this respect, the setting error at the time of the production can be effectively prevented by using the parameter and the firmware that are actually written to the industrial equipment.

Further, when the history of the setting information is stored in the equipment information database, the industrial equipment can be produced based on any one of the pieces of setting information included in the history. For example, the industrial equipment deteriorates over time, which necessitates the setting of the parameter and the like corresponding to the current status of the industrial equipment, but there is a fear that the parameter and the like for the industrial equipment that has deteriorated over time may not be compatible with the industrial equipment to be newly produced. In addition, it may not be known how the industrial equipment is to operate unless the parameter and the like are set in actuality, and hence the user may notice that a parameter set in the past is preferred ex post facto. Therefore, the user may not always use the most recent one of the pieces of the setting information included in the history, and it is possible to perform optimal settings for the industrial equipment serving as the production target by allowing the setting information to be selected from the history, which improves usability for the user.

Further, the setting information can be registered in each industrial equipment, and hence the industrial equipment can be produced by using the setting information corresponding to the industrial equipment whose order is to be placed by the user. For example, the industrial equipment handled by the maker varies greatly, and when the specifications differ subtly even between seemingly similar industrial equipments, the setting information to be set for the industrial equipments may differ greatly. Therefore, by registering the setting information for each industrial equipment, the industrial equipment serving as the production target can be produced by using setting information optimal therefor.

Further, the setting information registered in the customization information database can be used not only once, but can be used repeatedly in accordance with the user's order placement. Therefore, when the user wishes to place the order of the industrial equipment with the same setting information as the previous one, there is no need to perform work for registering the setting information again, and hence it is possible to more effectively alleviate an operation load imposed on the user in the order placement, and to provide the maker with repeat orders.

Further, in the industrial equipment management system S, the setting information associated with the customization ID can be written to the industrial equipment, and hence processing up to the setting of the industrial equipment can be managed centrally. For example, in a case where only the registration and identification of the setting information are performed in the industrial equipment management system S while the setting of the industrial equipment is performed by manual work of a factory employee or performed in another system, such a human error that the information to be set is mixed up may occur, but by collectively performing the processing up to the setting of the industrial equipment as in this embodiment, it is possible to effectively prevent the setting error from occurring at the time of the production.

Further, in the industrial equipment management system S, it is possible to effectively alleviate the time and labor required when the plurality of industrial equipments are set based on the same setting information. For example, up to now, the user needs to perform such setting work separately for the respective industrial equipments, but in the industrial equipment management system S, the setting work is automatically executed, and hence it is possible to resolve complicatedness exhibited when the setting work is separately performed by the user and to efficiently perform the setting work. In particular, in the field of the industrial equipment, there may be a large number of equipments to be set based on the same setting information, and hence by setting the plurality of industrial equipments based on the same setting information, it is possible to more effectively alleviate the user's time and labor.

Further, in the industrial equipment management system S, the user can register the parameter in the customization information database by adjusting the parameter by using the prototype, and hence the industrial equipment can be produced based on an accurate parameter adjusted for the prototype in actuality. For example, the parameter to be set differs even between the industrial equipments of the same model when the use environment and the like differ depending on the user, and hence by providing the user with the prototype to allow the user to adjust the parameter, it is possible to set the parameter for the industrial equipment at a time of delivery with more accuracy, and to effectively prevent readjustment work from occurring after the delivery.

[Conclusion Regarding the Management of the Industrial Equipment]

Further, in the industrial equipment management system S described above, the industrial equipments for which the same setting information was used at the time of setting the industrial equipments can be grouped and managed, and hence the industrial equipment can be managed for each piece of the setting information, which facilitates the management of the industrial equipment. For example, from the user's viewpoint, the user is likely to own a large number of industrial equipments, but the industrial equipments having common settings at the time of the production thereof can be grouped, which allows the industrial equipments relating to one another to be easily identified without confirming each of the settings of the industrial equipments separately. For example, when a failure occurs in a given industrial equipment, there is a possibility that a failure also occurs in an industrial equipment produced based on the setting information that is the same as or similar to that of the given industrial equipment, and hence the user can identify the industrial equipment having the possibility to take a measure to prevent the failure. Further, from the maker's viewpoint, it is possible to identify the same or similar setting information, and hence in regard to the industrial equipment set based on a specific piece of the setting information, it is possible to provide the user with information on a new product or failure information on the industrial equipment, and to efficiently offer after-sales care for the user.

Further, the setting information is compared with the setting information to which the customization ID has already been generated to determine whether or not to newly generate the customization ID, which can prevent a plurality of customization IDs from being generated to similar setting information. Therefore, the user can easily manage the customization ID. Further, even from the maker's viewpoint, wasteful data is less often registered in the customization information database, which can reduce a data amount and facilitate the management of the data registered by the user.

Further, a difference between pieces of the setting information falling within the reference means that one of the pieces of the setting information resembles the other piece of the setting information to which the customization ID has already been generated, and hence by inhibiting the customization ID from being newly generated to the one of the pieces of the setting information, which allows the user to easily manage the customization ID. For example, the user who wishes to inhibit a subtle difference between the pieces of the setting information from strictly affecting the generation of the customization ID can perform the generation in accordance with his/her own preference by employing this generation method.

Further, by inhibiting the customization ID from being generated to the setting information that matches the setting information to which the customization ID has already been generated, it is possible to prevent a plurality of customization IDs from being generated to the same piece of the setting information, and hence, for example, the user who wishes to cause a difference between the pieces of the setting information to strictly affect the generation of the customization ID can perform the generation in accordance with his/her own preference by employing this generation method.

Further, by associating the customization ID with the industrial equipments designated by the user, when the setting is performed with the setting information associated with a specific industrial equipment, the industrial equipments can be grouped and managed. Therefore, the product management can be performed in more detail. For example, by associating not only the serial number and the customization ID but also the model with the industrial equipments to manage the industrial equipments, the user and the maker can easily manage the industrial equipments.

Further, the secret information within the customization ID is not assigned to the industrial equipment produced by using the customization ID, and hence the secret information cannot be known even in a case where a third party furtively looks at the public information assigned to the delivered industrial equipment, which inhibits the third party from placing an order by using the setting information associated with the customization ID. Therefore, it is possible to prevent the third party from wrongly copying the industrial equipment. In addition, the public information is assigned to the industrial equipment produced by using the customization ID, which allows the user who has registered the customization ID to identify what the setting information is only by viewing the public information.

Further, by generating the customization ID to the setting information for which the user has made the generation request, it is possible to generate the customization ID to a specific piece of the setting information. For example, the number of customization IDs can become enormous when the customization ID is generated each time the setting information is received, but the customization ID can be generated only to a necessary piece of the setting information by generating the customization ID with the user designating the piece of the setting information to be used for the order placement.

Further, the industrial equipments having a common parameter at the time of the production can be grouped and managed, and hence, for example, when a failure has occurred in the industrial equipment for which a specific parameter is set, the industrial equipment for which the specific parameter is set can be identified without separately confirming the settings, which allows the management such as prevention of a failure to be performed effectively.

Modification Example

Data stored in the equipment information database is not limited to the one given in the above-mentioned example. In the case where an encoder is connected to each motor control device 10 in order to detect the rotational position of the relevant motor 1, for example, the motor control device 10 may operate based on motor information (of which details are described later) stored in a memory of the encoder. In the case where no encoders are used, on the other hand, the motor information may be stored in the equipment information database. In this manner, the motor control device 10 can positively identify information on the motor 1 even when there is no encoder.

The motor information in this case may be stored for each motor control device 10 in the user area that is associated with the serial number of the motor control device 10, or may be stored for each motor 1 in the maker area or the user area that is associated with the serial number of the motor 1. Each motor control device 10 acquires the motor information from the cloud server 60 via the controller 40 at an arbitrary timing (for example, the time when control of the motor 1 is started). Alternatively, the motor control device 10 may acquire the motor information from the cloud server 60 via the motor control device maintenance terminal 20. In the case of the motor control device 10 that can be connected to the network N, the motor control device 10 may acquire the motor information directly from the cloud server 60.

The motor information managed on the cloud server 60 includes, for example, (1) the type of the motor 1 (a rotary type, a linear type, and the like), (2) model information of the motor 1 (the model number and the like), and (3) parameter information about the motor 1. It suffices that parameters suitable for the type of the motor 1 of interest are stored as the parameter information. In the case of a rotary type, for example, rated torque, rated power, rated rotational speed, instantaneous maximum torque, motor inertia moment, pole number, highest rotational speed, rated current, maximum current, d-axis inductance, and q-axis inductance are stored as the parameter information. In the case of a linear type, for example, maximum thrust, rated thrust, moving coil mass, rated speed, highest speed, pole pitch, rated current, maximum current, d-axis inductance, and q-axis inductance are stored as the parameter information.

Further, the description of the embodiment is directed to a case where the user uses the motor control device maintenance terminal 20 to generate the customization ID, but it suffices that a terminal that can be connected to the cloud server 60 is used, and, for example, the user may use the maintenance-use portable terminal 30 or the controller maintenance terminal 50 to generate the customization ID.

Further, the description of the embodiment is directed to a case where the user selects the setting information registered in the equipment information database to generate the customization ID, but it suffices that the customization ID is generated to the setting information designated by the user. For example, the user may manually inputs a numerical value of the parameter through the generation screen 100, or may select the kind and version of the firmware. Further, the description of this embodiment is directed to a case where the equipment information registration unit 62 registers the history of the setting information, but the setting information registration unit 66d may repeatedly acquire the setting information, and may register the history of the setting information in the customization information database. In this case, the history reception unit 65c may receive the designation of the setting information included in the history stored in the customization information database, and the identification unit 82c may identify the designated setting information.

Further, the description of the embodiment is directed to a case where the customization ID is not newly generated when the setting information that is the same as or similar to the setting information to which the customization ID has already been generated is designated, but in this case, the same customization ID as the already-generated customization ID described above may be generated (regenerated) and may be associated with the designated setting information described above. That is, when the generation determination unit 66b determines that the generation is not performed, the identification information generation unit 66c regenerates the already-generated customization ID, and associates the customization ID with the setting information received by the setting information reception unit 65. Further, in this case, a specific customization ID associated with the already-generated customization ID among the customization IDs stored in the customization information database (for example, specific customization ID including the same information as a part of the already-generated customization ID) may be regenerated.

As described above, even when the customization ID is not newly generated, the customization ID is regenerated and managed in association with the setting information, to thereby be able to associate the plurality of pieces of the setting information to one customization ID. For example, by selecting the plurality of pieces of the setting information associated with one customization ID, it is possible to group and manage the pieces of the setting information having similar contents, which can improve usability for the user.

Further, the description is directed to a case where the user operates the motor control device maintenance terminal 20 to place an order of the industrial equipment, but a flow of the order placement for the industrial equipment is not limited thereto. It suffices that the maker is notified of the contents of the user's order placement, and in addition, the maker may be notified of the contents of the order placement through an agent or the like. In this case, a person in charge for the maker may examine whether or not the customization ID designated by the user exists in the customization information database. When the customization ID exists, the person in charge for the maker may perform a predetermined order placement reception operation, to thereby resister data in the order reception management database.

Further, the embodiment is described by taking an exemplary case where the motor control device 10 is produced as an example of the industrial equipment, but the industrial equipment to be produced in the industrial equipment management system S is not limited thereto. In addition to the servo amplifier described as an example the motor control device 10, the industrial equipment management system S can perform the production management of general industrial equipments such as a controller, an inverter, and a robot controller. In this case, it suffices that the setting information for the controller, the inverter, the robot controller, and the like is registered in the cloud server 60, and, based on the registered setting information, the setting information on the industrial equipment at the time of the production is identified. Therefore, the setting information registered in the cloud server 60 may be any piece of setting information on the industrial equipment serving as the production target, and is not limited to the parameter or the firmware for the motor control device 10 described above.

A diversity of communication protocols can be applied to the transmission/reception of various kinds of data between an industrial equipment that can be connected to the network N (for example, the controller 40) and the respective servers (for example, the cloud server 60). An example of the communication protocols that can be used is File Transfer Protocol (FTP).

For example, the function of an FTP client is installed in the industrial equipment and the function of an FTP server is installed in the server. In this case, the server that is an FTP server waits for a communication connection request conforming to FTP from the industrial equipment that is an FTP client. Once issuing the communication connection request to the server, the industrial equipment can transfer data and a program that are stored in its own storage (for example, settings information of the industrial equipment, firmware, and logging data that is a record of the operation situation or the like of the industrial equipment) to the server as a transfer target file to be recorded in the server-side storage. The industrial equipment can further acquire data and a program that are stored in the server-side storage (for example, settings information of this or another industrial equipment, and firmware) as a transfer target file to be recorded in its own storage. In this manner, the industrial equipment can transfer data between its own storage and the server-side storage at an arbitrary timing.

This embodiment also encompasses a case opposite to the one described above in which the function of an FTP server is installed in the industrial equipment and the function of an FTP client is installed in the server. In this case, the industrial equipment that is an FTP server waits for a communication connection request conforming to FTP from the server that is an FTP client. Once issuing the communication connection request to the industrial equipment, the server can transfer data and a program that are stored in the server-side storage (for example, settings information of this or another industrial equipment, firmware) to the industrial equipment as a transfer target file to be recorded in the storage of the industrial equipment. The server can further acquire data and a program that are stored in the storage or the industrial equipment (for example, settings information of the industrial equipment, firmware, and logging data) as a transfer target file to be recorded in its own storage. In this manner, the server can transfer data between the server-side storage and the storage of the industrial equipment at an arbitrary timing.

In the case where a file transmitted/received in the manner described above is data that is stored in the user area of the equipment information, data registered in the user area by each user can be acquired by the industrial equipment from the server, or can be transferred from the server to the industrial equipment, at an arbitrary timing.

Further, in a case where in a case where the setting of the industrial equipment has been performed based on the setting information associated with identification information, the equipment management unit 69 may be indicating means for indicating, in a case where setting of the industrial equipment is performed based on the setting information associated with the generated identification information, that the setting of the industrial equipment is performed based on the setting information. For example, the equipment management unit 69 indicates that the above-mentioned setting has been performed by recording or outputting information indicating that the setting has been performed based on the setting information associated with the identification information. It is possible to identify that, with reference to the information, the setting has been performed for the industrial equipment based on the setting information associated with the identification information, which facilitates the management of the setting of the industrial equipment. More specifically, the equipment management unit 69 may use a database to manage thereon the fact that the setting has been performed based on the setting information associated with the identification information. In this case, other than the method of associating the identification information with the individual identification information as described in the embodiment and the like, the equipment management unit 69 may generate, in accordance with a predetermined generation rule, information (for example, character string for identifying the fact that the setting has been performed) indicating that the setting has been performed based on the setting information associated with the identification information, and may record the information in a memory (for example, customization information database storage unit 61*c*). In addition, for example, the equipment management unit 69 may print the information indicating that the setting has been performed based on the setting information associated with the identification information by the printer or the like, or may output the information as image data. The identification information generation unit 66*c* may be generating means for generating the identification information in a case where the setting information to be set for the industrial equipment is received, and associates the identification information with the setting information. The setting information reception unit 65 may be receiving means for receiving the setting information to be set for the industrial equipment. The generation determination unit 66*b* may be determining means for determining whether or not to cause the generating means to generate the identification information based on the received setting information and the setting information associated with the already-generated identification information. The equipment reception unit 64 may be equipment receiving means for receiving designation of at least one of the plurality of industrial equipments. The information assigning unit 82*e* may be assigning means for assigning, in a case where the setting of the industrial equipment is performed based on the setting information associated with the generated identification information, the public information within the identification information to the industrial equipment without assigning the secret information. The generation request reception unit 63 may be request receiving means for receiving the generation request for the identification information.

Further, the embodiment described above is given as a concrete example, and is not to limit the invention disclosed herein to the very configuration and data storage examples of the concrete example. A person skilled in the art may make various modifications to the disclosed embodiment with regard to, for example, the shapes and counts of physical components, data structures, and execution orders of processing. It is to be understood that the technical scope of the invention disclosed herein encompasses such modifications. It should be understood by those skilled in the art that various modifications, combinations, sub-combinations and alterations may occur depending on design requirements and other factors insofar as they are within the scope of the appended claims or the equivalents thereof.

What is claimed is:
1. An industrial equipment management system, comprising at least one processor configured to:
  receive setting information for operating first industrial equipment which controls at least one first motor based on the setting information;
  generate, if the setting information is received, a customization ID for ordering second industrial equipment which controls at least one second motor based on the setting information, wherein the customization ID comprises public information unique to the customization ID and secret information for ordering the second industrial equipment;
  associate the customization ID with the setting information in a first database;
  write, if the customization ID which is designated by a user who orders the second industrial equipment exists in the first database and the first setting information is associated with a user ID of the user, the setting information associated with the customization ID into the second industrial equipment;
  write the public information to the second industrial equipment and print the public information; and
  associate, if the setting information associated with the customization ID is written into the second industrial equipment, individual identification information of the second industrial equipment with the customization ID in a second database, wherein the second industrial equipment controls the at least one second motor based on the setting information which was written.

2. The industrial equipment management system according to claim 1, wherein the at least one processor determines whether or not to generate the customization ID based on the received setting information and the setting information associated with the already-generated customization ID.

3. The industrial equipment management system according to claim 2, wherein the at least one processor:

determines whether or not a difference between the received setting information and the setting information associated with the already-generated customization ID is within a reference; and does not generate the customization ID where it is determined that the difference is within the reference, and generates the customization ID where it is determined that the difference is not within the reference.

4. The industrial equipment management system according to claim 2, wherein the at least one processor:

determines whether or not the received setting information and the setting information associated with the already-generated customization ID are the same; and does not generate the customization ID where it is determined that the received setting information and the associated setting information are the same, and generates the customization ID where it is determined that the received setting information and the associated setting information are not the same.

5. The industrial equipment management system according to claim 2, wherein the at least one processor regenerates the already-generated customization ID and associates the already-generated customization ID with the received setting information where it is determined that the at least one processor does not generate the customization ID.

6. The industrial equipment management system according to claim 1, wherein the at least one processor:

receives designation of at least one of a plurality of the first industrial equipment;

associates the generated customization ID with the designated first industrial equipment and the received setting information; and associates the individual identification information on the second industrial equipment with the customization ID.

7. The industrial equipment management system according to claim 1, wherein the at least one processor:

receives a generation request for the customization ID; and generates the customization ID where the generation request is received.

8. The industrial equipment management system according to claim 1, wherein the setting information comprises a parameter for the first industrial equipment adjustable by a user.

9. The industrial equipment management system according to claim 1 further comprising:

the first industrial equipment;
the at least one first motor;
the second industrial equipment; and
the at least one second motor.

10. An industrial equipment management server, comprising at least one processor configured to:

receive setting information for operating first industrial equipment which controls at least one first motor based on the setting information;

generate, if the setting information is received, a customization ID for ordering second industrial equipment which controls at least one second motor based on the setting information, wherein the customization ID comprises public information unique to the customization ID and secret information for ordering the second industrial equipment;

associate the customization ID with the setting information in a first database;

write, if the customization ID which is designated by a user who orders the second industrial equipment exists in the first database and the first setting information is associated with a user ID of the user, the setting information associated with the customization ID into the second industrial equipment;

write the public information to the second industrial equipment and print the public information; and associate, if the setting information associated with the customization ID is written into the second industrial equipment, individual identification information of the second industrial equipment with the customization ID in a second database, wherein the second industrial equipment controls the at least one second motor based on the setting information which was written.

11. An industrial equipment management method, comprising:

receiving setting information for operating first industrial equipment which controls at least one first motor based on the setting information;

generating, if the setting information is received, a customization ID for ordering second industrial equipment which controls at least one second motor based on the setting information, wherein the customization ID comprises public information unique to the customization ID and secret information for ordering the second industrial equipment;

associating the customization ID with the setting information in a first database;

writing, if the customization ID which is designated by a user who orders the second industrial equipment exists in the first database and the first setting information is associated with a user ID of the user, the setting information associated with the customization ID into the second industrial equipment;

write the public information to the second industrial equipment and print the public information; and associating, if the setting information associated with the customization ID is written into the second industrial equipment, individual identification information of the second industrial equipment with the customization ID in a second database, wherein the second industrial equipment controls the at least one second motor based on the setting information which was written.

12. A non-transitory computer-readable information storage medium having stored thereon a program for causing a computer to:

receive setting information for operating first industrial equipment which controls at least one first motor based on the setting information;

generate, if the setting information is received, a customization ID for ordering second industrial equipment which controls at least one second motor based on the setting information, wherein the customization ID comprises public information unique to the customization ID and secret information for ordering the second industrial equipment;

associate the customization ID with the setting information in a first database;

write, if the customization ID which is designated by a user who orders the second industrial equipment exists in the first database and the first setting information is associated with a user ID of the user, the setting information associated with the customization ID into the second industrial equipment;

write the public information to the second industrial equipment and print the public information; and associate, if the setting information associated with the customization ID is written into the second industrial equipment, an individual identification information of the second industrial equipment with the customization ID in a second database, wherein the second industrial equipment controls the at least one second motor based on the setting information which was written.

13. An industrial equipment management system, comprising:

generating means for generating, if setting information for operating first industrial equipment which controls at least one first motor based on the setting information is received, a customization ID for ordering second industrial equipment which controls at least one second motor based on the setting information, wherein the customization ID comprises public information unique to the customization ID and secret information for ordering the second industrial equipment;

first associating means for associating the customization ID with the setting information in a first database;

first writing means for writing, if the customization ID which is designated by a user who orders the second industrial equipment exists in the first database and the first setting information is associated with a user ID of the user, the setting information associated with the customization ID into the second industrial equipment;

second writing means for writing the public information to the second industrial equipment; and printing means for printing the public information; and second associating means for associating, if the setting information associated with the customization ID is written into the second industrial equipment, individual identification information of the second industrial equipment with the customization ID in a second database, wherein the second industrial equipment controls the at least one second motor based on the setting information which was written.

* * * * *